United States Patent

Saito

[11] Patent Number: 5,691,864
[45] Date of Patent: Nov. 25, 1997

[54] MAGNETORESISTIVE HEAD

[75] Inventor: Masamichi Saito, Niigata-ken, Japan

[73] Assignee: Alps Electric Co., Ltd., Tokyo, Japan

[21] Appl. No.: 674,942

[22] Filed: Jul. 3, 1996

[30] Foreign Application Priority Data

Jul. 19, 1995 [JP] Japan ................................ 7-183121

[51] Int. Cl.[6] ................................................ G11B 5/39
[52] U.S. Cl. ................................................ 360/113
[58] Field of Search ........................................ 360/113

[56] References Cited

U.S. PATENT DOCUMENTS

| | | | |
|---|---|---|---|
| 4,663,685 | 5/1987 | Tsang | 360/113 |
| 4,755,897 | 7/1988 | Howard | 360/113 |
| 5,315,468 | 5/1994 | Lin et al. | 360/113 |
| 5,408,377 | 4/1995 | Gurney | 360/113 |

Primary Examiner—A. J. Heinz
Attorney, Agent, or Firm—Guy W. Shoup; Patrick T. Bever

[57] ABSTRACT

As an antiferromagnetic layer achieving exchange anisotropic coupling with a ferromagnetic layer, any Mn alloy of Ru-Mn, Rh-Mn, Ir-Mn, Pd-Mn, and Pt-Mn alloys is used. The content of each element is 10 to 45 atomic % for Ru, 10 to 40 atomic % for Rh, 10 to 40 atomic % for Ir, 10 to 25 atomic % for Pd, and 10 to 25 atomic % for Pt, respectively. Since the alloy exhibits excellent corrosion resistance and exchange anisotropic magnetic field in spite of its irregular crystal structure, no high temperature treatment is required in order to achieve a change in the crystal structure. The alloy is durable to high temperature due to a decreased change in the exchange anisotropic magnetic field.

16 Claims, 2 Drawing Sheets

MAGNETORESISTIVE HEAD

BACKGROUND OF THE INVENTION

1. Field of the Invention

The present invention relates to thin film magnetic heads mounted in magnetic reproducing units and other magnetic detecting units, such as hard disk units, and more particularly, to a thin film magnetic head having a magnetic layer having a magnetoresistive effect and an antiferromagnetic layer for magnetizing such a magnetic layer by exchange anisotropic coupling.

2. Description of the Related Art

Thin film magnetic heads using magnetoresistance effect are known for reproducing magnetic signals recorded with high density on recording media. In thin film magnetic heads, the magnetization direction of the ferromagnetic layer composing a magnetoresistive sensor is fixed. An example of the fixation methods of the magnetization direction is an exchange anisotropic coupling method with an antiferromagnetic layer. Such anisotropic coupling methods include an exchange bias method as shown in FIG. 1, and a spin-valve method as shown in FIG. 2.

FIG. 1 is a front view of an exchange bias-type thin film magnetic head, wherein a magnetic medium, such as a hard disk, moves in the Z direction, and the magnetic flux leaks in the Y direction from the magnetic medium.

In the exchange bias-type thin film magnetic head as shown in FIG. 1, a soft magnetic layer 2 composing a magnetoresistive sensor (i), a non-magnetic layer 3, and a ferromagnetic layer 4 having a magnetoresistance effect are separately deposited on a lower insulation layer 1, such as $Al_2O_3$. An antiferromagnetic layer 5 is deposited on the ferromagnetic layer 4 with a space corresponding to the track width Tw, and a lead layer 6 is formed thereon. Further, an upper insulation layer 7, such as $Al_2O_3$, is deposited thereon.

By the exchange anisotropic coupling at the interface between the ferromagnetic layer 4 and the antiferromagnetic layer 5, the ferromagnetic layer 4 is longitudinally biased so as to put Region B into a single domain state in the X direction. Being induced by this, the ferromagnetic layer 4 is put into a single domain state in the Y direction at Region A within the track width. A stationary current is supplied from the lead layer 6 to the ferromagnetic layer 4 through the antiferromagnetic layer 5. When the stationary current is supplied to the ferromagnetic layer 4, the ferromagnetic layer 4 is laterally biased in the Y direction due to the static magnetic coupling energy from the soft magnetic layer 2. When a leakage magnetic field from the magnetic medium is applied to the ferromagnetic layer 4 which is magnetized with the longitudinal and lateral biases, the electrical resistance against the stationary current varies in proportion to the magnitude of the leakage magnetic field, and thus the leakage magnetic field is detected by the variance of the electrical resistance.

In the thin film magnetic head as shown in FIG. 2, a soft magnetic layer 8 composing a magnetoresistive sensor (ii), a non-magnetic conductive layer 8, and a ferromagnetic layer 4 are deposited on a lower insulation layer 1. Further, an antiferromagnetic layer 5 is provided on the ferromagnetic layer 4. A stationary current is applied to the magnetoresistive sensor (ii). The magnetization of the ferromagnetic layer 4 is fixed in the Y direction by means of exchange anisotropic coupling, and the magnetization direction of the soft magnetic layer 8 varies when a leakage magnetic field from a magnetic medium moving in the Z direction is applied. The electrical resistance of the magnetoresistive sensor (ii) varies with the variance of the magnetization direction of the soft magnetic layer 8 relative to the fixed magnetization direction of the ferromagnetic layer 4. A leakage magnetic field can be detected in such a manner.

In the above-mentioned magnetoresistive sensors (i) and (ii), nickel-iron (Ni-Fe) alloys are used for the ferromagnetic layer 4. Further, iron-manganese (Fe-Mn) alloys are conventionally used for the antiferromagnetic layer 5 to realize the exchange anisotropic coupling of the antiferromagnetic layer 5 with the ferromagnetic layer 4. By the exchange interaction between the magnetic moments of the Ni-Fe alloy and the Fe-Mn alloy at the interface, the magnetization of the Ni-Fe alloy as the ferromagnetic layer 4 exhibits uniaxial anisotropy. As a result, a hysteresis M-H loop, which represents the correlation between the external magnetic field (H) applied to the Ni-Fe alloy and the magnetization (M) of the Ni-Fe alloy, shifts to the intensity direction of the external magnetic field (H). The quantity of the M-H loop shift is hereinafter called exchange anisotropic magnetic field (Hex). As the antiferromagnetic layer 5 exhibiting the exchange anisotropic coupling with the Ni-Fe alloys, Fe-Mn alloys, for example, having a face centered cubic lattice (f,c,c order) have been known.

As requirements for thin film magnetic heads utilizing the exchange anisotropic coupling between the ferromagnetic layer 4 and antiferromagnetic layer 5:

1) The thin film magnetic heads must sufficiently generate uniaxial magnetic anisotropy in the X direction (FIG. 1) or Y direction (FIG. 2) to the ferromagnetic layer 4 by means of the exchange anisotropic coupling. In other words, to enhance the exchange anisotropic magnetic field (Hex) set forth above.

2) They must exhibit excellent corrosion resistance.

3) They must not decrease the magnetic anisotropy due to the exchange anisotropic coupling with a thermal change. In other words, the exchange anisotropic magnetic field (Hex) hardly changes with a temperature change.

The Fe-Mn alloys, which have been used for the antiferromagnetic layer 5, are selected as magnetic materials for generating the exchange anisotropic coupling with the ferromagnetic layer 4, as set forth the above 1). However, these materials show poor corrosion resistances. The Fe-Mn alloys are readily oxidative corrosive materials, and such corrosion often causes the interlayer separation in the thin film magnetic heads shown in FIGS. 1 and 2. Further, the corrosion causes the variance of the magnetic characteristics of the Fe-Mn alloys themselves, i.e., the decreased uniaxial magnetic anisotropy, and the decrease in the single domain state or the fixed magnetization direction to the ferromagnetic layer 4.

In addition, when the Fe-Mn alloys are used for the antiferromagnetic layer 5, the exchange anisotropic magnetic field (Hex) readily varies with temperature changes. Table 6, which will be discussed later, shows in the right column the correlation between the temperature and the exchange anisotropic magnetic field (Hex) when a $Fe_{50}Mn_{50}$ (atomic %) alloy is used as the antiferromagnetic layer. Table 6 demonstrates that the exchange anisotropic magnetic field (Hex) remarkably varies when its environmental temperature exceeds 120° to 140° C. In hard disks using such kinds of thin film magnetic heads, the environmental temperatures of the magnetoresistive sensors may rise up to around 120° C. When the exchange anisotropic magnetic field (Hex) and the magnetic anisotropy of the ferromagnetic layer 4 decrease under such a high temperature environment, the noise ratio increases relative to the signal reading output from the magnetic medium.

U.S. Pat. No. 5,315,468 discloses the use of a Ni-Mn alloy having a regular crystal structure of a face centered tetragonal lattice (f,c,t order; CuAuI crystal structure) as the antiferromagnetic layer 5. That is, when the Ni-Mn alloy having a regular crystal structure is used as the antiferromagnetic layer 5, the exchange anisotropic coupling is satisfactorily generated between the ferromagnetic layer 4 and the antiferromagnetic layer 5, the exchange anisotropic magnetic field (Hex) barely varies with temperature changes, and corrosion resistance is improved.

In such a case, however, after each layer shown in FIGS. 1 and 2 and the Ni-Mn alloy as the antiferromagnetic layer 5 are deposited by sputtering or the like, the resulting magnetic held must be subjected to heat treatment at a high temperature. In order to convert the crystal structure of the deposited Ni-Mn alloy into the regular face centered tetragonal lattice (f,c,t order; CuAuI crystal structure), the heat treatment temperature is limited and a longer treatment time is required. As described in the U.S. Patent set forth above, the heat treatment temperature is limited to a narrow high temperature range of around 260° C. and a time of dozens hours is required. Such a heat treatment must be repeated several times, if necessary.

The heat treatment at a high temperature of around 260° C. significantly affects the deposited layers compared with conventional annealing treatments which have been carried out in order to remove the strain of the layers deposited by sputtering, for example. When a heat treatment of higher temperature and a longer time than conventional annealing is carried out to achieve a face centered tetragonal lattice in the Ni-Mn alloy, interdiffusion may occurs between magnetic layers shown in FIGS. 1 and 2. The interdiffusion varies magnetic characteristics of each layer, resulting in the overall characteristics of the magnetic head.

The thin film magnetic head is provided with an organic insulation layer, as well as the metallic magnetic layers and a lead layer. For example, in magnetic heads for hard disk devices, an inductive-type thin film recording head is deposited on the thin film magnetic head for detecting magnetism shown in FIGS. 1 and 2. The coil layer and the like in the thin film magnetic head is insulated with an organic insulation layer, e.g. a polyimide resin. When such a layered magnetic head is subjected to heat treatment at a high temperature for a long time, some dielectric breakdowns may occur in the organic insulation layer.

Further, in heat treatment at the limited temperature for a long time, the temperature and time controls are complicated and time-consuming. As a result, such heat treatment causes increased production costs.

SUMMARY OF THE INVENTION

The foregoing drawbacks have been solved by the present invention. It is an object of the present invention to provide a thin film magnetic head provided with an antiferromagnetic layer, having excellent corrosion resistance, in which unidirectional magnetic anisotropy is achieved by exchange anisotropic coupling with the ferromagnetic layer, the exchange anisotropic magnetic field barely varies with temperature changes, and high temperature, long-time heat treatment is not required.

A thin film magnetic head in accordance with the present invention comprises a magnetoresistive sensor and an antiferromagnetic layer. The magnetoresistive sensor includes a ferromagnetic layer magnetized by exchange anisotropic coupling with said antiferromagnetic layer. The antiferromagnetic layer is an X-Mn (manganese) alloy having an irregular crystal structure, wherein X is at least one element selected from the group consisting of Ru (ruthenium), Rh (rhodium), Ir (iridium), Pd (palladium), and Pt (platinum).

The element X may be at least two elements selected from the group consisting of Ru, Rh, Ir, Pd and Pt.

The above-mentioned Mn alloy has an irregular crystal structure which represents a state not having a regular crystal structure such as a face centered tetragonal lattice (f,c,t order; CuAuI structure and CuAuII structure). Therefore, the Mn alloy in accordance with the present invention is not subjected to high-temperature, long-time heat treatment after the film deposition process, such as sputtering, for forming a regular crystal structure, such as a face centered tetragonal lattice (CuAuI or CuAuII structure), wherein the irregular crystal structure indicates that the alloy is in the as-deposited state or in a conventionally annealed state.

Preferable ranges of the X content in the binary X-Mn alloys are 10 to 45 atomic % for Ru, 10 to 40 atomic % for Rh, 10 to 40 atomic % for Ir, 10 to 25 atomic % for Pd, and 10 to 25 atomic % for Pt, respectively. These ranges include the upper and lower limits, for example, "10 to 45 atomic %" includes both 10 atomic % and 45 atomic %.

DESCRIPTION OF THE PREFERRED EMBODIMENTS

Figure 1:
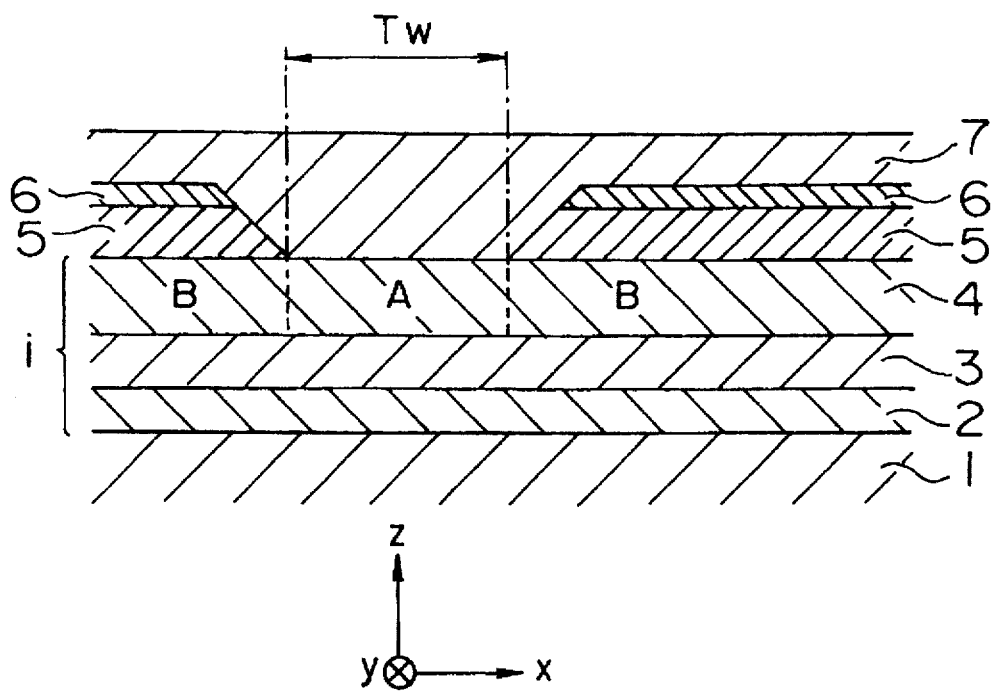
FIG. 1 is a frontal sectional view of an exchange bias-type thin film magnetic head.

In the present invention, any of Ru-Mn, Rh-Mn, Ir-Mn, Pd-Mn, and Pt-Mn alloys among X-Mn alloys exhibits a satisfactory exchange anisotropic coupling with a Ni-Fe alloy ferromagnetic layer by setting the X atomic content to an appropriate range, even when a regular crystal structure, such as a cubic centered tetragonal lattice (CuAuI structure and CuAuII structure) is not achieved or an irregular crystal structure formed during the film deposition is left, as it is.

Mn alloys with at least one element as X, selected from the group consisting of Ru, Rh, Ir, Pd, and Pt, have excellent corrosion resistance and decreased exchange anisotropic magnetic field (hex) variation with temperature changes compared with conventional Fe-Mn alloys in the antiferromagnetic layer. Thus, thin film magnetic heads using the above-mentioned Mn alloys as the antiferromagnetic layer each having an irregular crystal structure is highly resistive against the environmental change, barely makes noise during detecting the leakage magnetic field from the magnetic medium, and thus enables a high precision magnetic detection.

In addition, because the X-Mn alloys set forth above are used in the state of the irregular crystal structure, they do not require high-temperature, long-time heat treatment after the film deposition for achieving a regular crystal structure, such as a cubic centered tetragonal lattice. There is no magnetic characteristic variation or deterioration by the diffusion between magnetic layers, or no dielectric breakdown of the organic insulation layer during the heat treatment.

In X-Mn alloys having irregular crystal structures, when the X (Ru, Rh, Ir, Pd, or Pt) content increases, the corrosion resistance is improved as shown in Tables 1 through 5. However, the exchange anisotropic magnetic field (Hex) with a Ni-Fe alloy ferromagnetic layer has the maximum value at a certain X content and decreases with a higher X content to zero oersted (Oe). Thus, when X-Mn alloys are used as the antiferromagnetic layer, the X content is limited to the range exhibiting a satisfactory level of corrosion resistance and exchange anisotropic magnetic field.

Preferable ranges of the X content in the binary X-Mn alloys are 10 to 45 atomic % for Ru, 10 to 40 atomic % for Rh, 10 to 40 atomic % for Ir, 10 to 25 atomic % for Pd, and 10 to 25 atomic % for Pt, respectively. In these ranges, Hex is greater than zero and corrosion resistance is good, fairly good, or excellent in Tables 1 through 5. More preferable ranges are 25 to 45 atomic % for Ru, 30 to 40 atomic % for Rh, and 30 to 40 atomic % for Ir, respectively. In such ranges, Hex is greater than zero and the corrosion resistance is fairly good or excellent.

In more detail, the preferable ranges in which Hex is greater than zero and the corrosion resistance is good, fairy good, or excellent, are 15.5 to 44.0 atomic % for Ru, 19.2 to 37.0 atomic % for Rh, 15.2 to 35.5 atomic % for Ir, 12.4 to 22.6 atomic % for Pd, and 10.9 to 21.3 atomic % for Pt, respectively. The more preferable ranges in which Hex is greater than zero and the corrosion resistance is fairy good or excellent, are 29.0 to 44.0 atomic % for Ru, 32.8 to 37.0 atomic % for Rh, and approximately 35.5 atomic % for Ir, respectively.

Examples in accordance the present invention will be explained.

Figure 2:
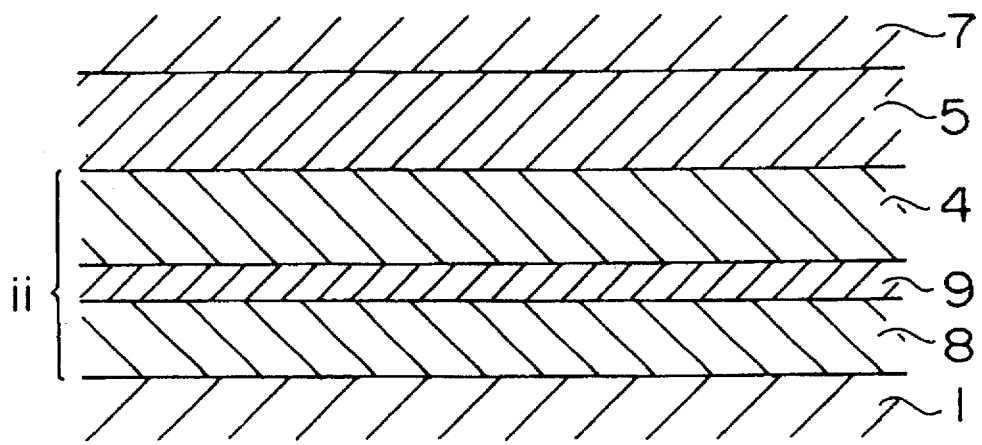
FIG. 2 is a frontal sectional view of a spin-valve-type thin film magnetic head.

In the present invention, an exchange bias layer or antiferromagnetic layer 5 deposited on a ferromagnetic layer 5 in a magnetoresistive sensor (i) is used for an exchange bias-type thin film magnetic head shown in FIG. 1, and an X-Mn alloy having an irregular crystal structure is used as an antiferromagnetic layer 5 deposited on a ferromagnetic layer 4 in a magnetoresistive sensor (ii) of a spin-valve-type thin film magnetic head shown in FIG. 2. Element X is at least one element selected from the group consisting of Ru, Rh, Ir, Pd, and Pt.

In FIG. 1, a lower insulation layer 1, e.g. $Al_2O_3$, a soft magnetic layer 2, e.g. Co-Zr-Mo alloy, a non-magnetic layer 3, e.g. Ta, a ferromagnetic layer 4, e.g. Ni-Fe alloy, and an antiferromagnetic layer 5 are separately deposited by sputtering. In FIG. 2, a lower insulation layer 1, e.g. $Al_2O_3$, a soft magnetic layer 8, e.g. Ni-Fe alloy, a non-magnetic electrical conductive layer 9, e.g. Cu, a ferromagnetic layer 4, e.g. Ni-Fe alloy, and an antiferromagnetic layer 5 are separately deposited. In two cases, an upper insulation layer 7, e.g. $Al_2O_3$, is deposited on the antiferromagnetic layer 5.

The X-Mn alloy of the antiferromagnetic layer 5 in accordance with the present invention is in the as-deposited state or conventionally annealed in order to remove the strain and have an irregular crystal structure.

As shown in Tables 1 through 5 below, the corrosion resistance and exchange anisotropic magnetic field (Hex) in the X-Mn alloy having an irregular crystal structure vary with the X content. The following Experiments 1 and 2 was carried out to determine a preferable X content for the use of the antiferromagnetic layer 5. Tables 1 through 2 show evaluation results of Experiments 1 and 2.

[Experiment 1: Hex Measurement]

A series of deposited films were used, in which a 200-angstrom Ta barrier layer, a 200-angstrom $Ni_{80}Fe_{20}$ (atomic %) alloy ferromagnetic layer thereon, a 300-angstrom X-Mn alloy antiferromagnetic layer thereon in which the X content is varied, and a 200-angstrom Ta barrier layer thereon are deposited on a glass substrate by sputtering. The deposition was carried out using RF conventional sputtering equipment. On a 8-inch-diameter Mn target, a 10-mm by 10-mm by 1-mm Ru, Rh, Ir, Pd, or Pt pellet was appropriately placed to control the film composition. A magnetic field of ±50 oersteds (Oe) is applied during the film deposition. The experiment was carried out in an irregular crystal state without the heat treatment for changing the crystal structure of the X-Mn alloy.

An external magnetic field is applied to the deposited film and the uniaxial anisotropic magnetization of the ferromagnetic layer ($Ni_{80}Fe_{20}$ alloy) was measured to determine a M-H loop. The exchange anisotropic magnetic field (Hex) is determined from the shift value of the M-H loop.

[Experiment 2: Corrosion Resistance Evaluation]

A series of deposited films were used, in which a 200-angstrom Ta barrier layer, and a 300-angstrom X-Mn alloy layer thereon in which the X content is varied, are deposited on a glass substrate by sputtering. The heat treatment for changing the irregular crystal structure of the X-Mn alloy was not carried out after the deposition. After each sample was allowed to stand for 96 hours under the conditions of a temperature of 80° C. and a relative humidity of 90%, the corrosion area in the 20-$mm^2$ surface was determined with a microscope. The corrosion resistance is expressed as "Excellent" for a corrosion area ratio of 0%, "Fairly good" for 0 to 10%, "Good" for 10 to 70%, or "No Good" for 70% or more of the entire surface area, i.e., 20 $mm^2$.

Results will be discussed below.

RU-Mn alloy

Table 1 shows the results of the corrosion resistance and the exchange anisotropic magnetic field (Hex) of Ru-Mn alloys.

Table 1 demonstrates that a Ru content of 0.8 to 8.2 atomic % has a poor or "No Good" corrosion resistance. The corrosion resistance is "Good" in a Ru content of 15.5 atomic percent or more, "Fairly Good" in 29.0 atomic % or more, and "Excellent" in 44.0 atomic % or more. Thus, the corrosion resistance improves with the higher Ru content. On the corrosion resistance, the preferable Ru content is 15.5 atomic % or more when the alloy is used as the antiferromagnetic layer.

Table 1 also demonstrates that the Ru-Mn alloy having an irregular crystal structure has a satisfactory Hex value for the use of thin film magnetic heads. The Hex value increases in proportion with the Ru content in the Ru content of 0.0 to 22.0 atomic %. The Hex value has the maximum in the Ru content of 20 to 25 atomic %, decreases in the Ru content of 29.0 atomic % or more, and reaches zero oersted (Oe) at the Ru content of 50.0 atomic %. Thus, the alloy can be used as the antiferromagnetic layer when the Ru content is approximately 45 atomic % or less.

The preferable range, in which the corrosion resistance is "Good", "Fairly Good", or "Excellent", and Hex is greater than zero, is from 10 to 45 atomic % or from 15.5 to 44.0 atomic %. Further, the more preferable range, in which the corrosion resistance is "Fairly Good", or "Excellent", and Hex is greater than zero, is from 25 to 45 atomic % or from 29.0 to 44.0 atomic %.

TABLE 1

| Ru Content in the Film (Atomic %) | Hex (Oe) | Corrosion Resistance |
| --- | --- | --- |
| 0 | 6.5 | No Good |
| 8.2 | 18.6 | No Good |
| 15.5 | 30.7 | Good |
| 22.0 | 42.0 | Good |
| 29.0 | 34.0 | Fairly Good |
| 41.2 | 10.2 | Fairly Good |
| 44.0 | 3.6 | Excellent |
| 50.5 | 0 | Excellent |
| 72.0 | 0 | Excellent |
| $Fe_{50}Mn_{50}$ | 40.5 | No Good |

Rh-Mn alloy

Table 2 shows the results of the corrosion resistance and the exchange anisotropic magnetic field (Hex) of Rh-Mn alloys. Table 2 demonstrates that the corrosion resistance is "Good" in a Rh content of 19.2 atomic percent or more, and the corrosion resistance improves with the increased Rh content. On the corrosion resistance, the preferable Rh content is 19.2 atomic % or more when the alloy is used as the antiferromagnetic layer.

Table 2 also demonstrates that the Hex value increases in proportion with the Rh content in the Rh content of 5.1 to 19.2 atomic %, has the maximum in the Rh content of 15 to 20 atomic %, decreases in the Rh content of 22.4 atomic % or more, and reaches zero oersted (Oe) at the Rh content of 45.1 atomic %. Thus, the alloy can be used as the antiferromagnetic layer when the Rh content is approximately 40 atomic % or less.

The preferable range of the Rh content in the Rh-Mn alloy having an irregular crystal structure suitable for the antiferromagnetic layer, in which the corrosion resistance is "Good" or "Fairly Good", and Hex is greater than zero, is from 10 to 40 atomic % or from 19.2 to 37.0 atomic %. Further, the more preferable range, in which the corrosion resistance is "Fairly Good", and Hex is greater than zero, is from 30 to 40 atomic % or from 32.8 to 37.0 atomic %.

TABLE 2

| Rh Content in the Film (Atomic %) | Hex (Oe) | Corrosion Resistance |
| --- | --- | --- |
| 5.1 | 27.5 | No Good |
| 9.3 | 47.5 | No Good |
| 19.2 | 67.8 | Good |
| 22.4 | 58.6 | Good |
| 32.8 | 37.5 | Fairly Good |
| 37.0 | 11.6 | Fairly Good |
| 45.1 | 0 | Excellent |
| 50.8 | 0 | Excellent |

Ir-Mn alloy

Table 3 shows the results of the corrosion resistance and the exchange anisotropic magnetic field (Hex) of Ir-Mn alloys having irregular crystal structures. Table 3 demonstrates that the corrosion resistance is "Good" in a Ir content of 15.2 atomic percent or more.

The Hex value increases in proportion with the Ir content in the Ir content of 6.0 to 15.2 atomic %, has the maximum in the Ir content of 10 to 20 atomic %, decreases in the Ir content of 27.3 atomic % or more, and reaches zero oersted (Oe) at the Ir content of 46.0 atomic %.

The preferable range of the Ir content in the Ir-Mn alloy having an irregular crystal structure suitable for the antiferromagnetic layer, in which the corrosion resistance is "Good" or "Fairly Good", and Hex is greater than zero, is from 10 to 40 atomic % or from 15.2 to 35.5 atomic %. Further, the more preferable range, in which the corrosion resistance is "Fairly Good", and Hex is greater than zero, is from 30 to 40 atomic %.

TABLE 3

| Ir Content in the Film (Atomic %) | Hex (Oe) | Corrosion Resistance |
| --- | --- | --- |
| 6.0 | 34.2 | No Good |
| 7.4 | 36.0 | No Good |
| 15.2 | 38.7 | Good |
| 27.3 | 18.0 | Good |
| 35.5 | 10.5 | Fairly Good |
| 46.0 | 0 | Excellent |
| 58.0 | 0 | Excellent |

Pd-Mn alloy

Table 4 shows the results of the corrosion resistance and the exchange anisotropic magnetic field (Hex) of Pd-Mn alloys having irregular crystal structures. Table 4 demonstrates that the corrosion resistance is "Good" in a Pd content of 12.4 atomic percent or more.

The Hex value increases in proportion with the Pd content in the Pd content of 6.1 to 12.4 atomic %, has the maximum in the Pd content of 10 to 15 atomic %, decreases in the Pd content of 22.6 atomic % or more, and reaches zero oersted (Oe) at the Pd content of 29.0 atomic %.

The preferable range suitable for the antiferromagnetic layer, in which the corrosion resistance is "Good", and Hex is greater than zero, is from 10 to 25 atomic % or from 12.4 to 22.6 atomic %.

TABLE 4

| Pd Content in the Film (Atomic %) | Hex (Oe) | Corrosion Resistance |
| --- | --- | --- |
| 6.1 | 29.3 | No Good |
| 12.4 | 43.0 | Good |
| 16.6 | 20.2 | Good |
| 22.6 | 2.8 | Good |
| 29.0 | 0 | Fairly Good |
| 51.0 | 0 | Excellent |
| 59.0 | 0 | Excellent |

Pt-Mn alloy

Table 5 shows the results of the corrosion resistance and the exchange anisotropic magnetic field (Hex) of Pt-Mn alloys having irregular crystal structures. The corrosion resistance is "Good" in a Pt content of 10.9 atomic percent or more, and improves with the increased Pt content. Thus, when the Pt content exceeds 10.9 atomic %, the alloy is usable for the antiferromagnetic layer.

The Hex value increases in proportion with the Pt content in the Pt content of 5.2 to 10.9 atomic %, has the maximum in the Pt content of 8 to 15 atomic %, decreases in the Pt content of 17.5 atomic % or more, and reaches zero oersted (Oe) at the Pt content of 27.5 atomic %.

The preferable range suitable for the antiferromagnetic layer, in which the corrosion resistance is "Good", and Hex is greater than zero, is from 10 to 25 atomic % or from 10.9 to 21.3 atomic %.

TABLE 5

| Pt Content in the Film (Atomic %) | Hex (Oe) | Corrosion Resistance |
|---|---|---|
| 5.2 | 28.3 | No Good |
| 10.9 | 45.0 | Good |
| 17.5 | 16.5 | Good |
| 21.3 | 5.8 | Good |
| 27.5 | 0 | Fairly Good |
| 38.3 | 0 | Excellent |
| 50.5 | 0 | Excellent |
| 60.0 | 0 | Excellent |

As described above, the range of the X content in the X-Mn alloy usable for the antiferromagnetic layer is 10 to 45 atomic % and preferably 25 to 45 atomic % for Ru, 10 to 40 atomic % and preferably 30 to 40 atomic % for Rh, 10 to 40 atomic % and preferably 30 to 40 atomic % for Ir, 10 to 25 atomic % for Pd, and 10 to 25 atomic % Pt.

It can be readily understood that a similar corrosion resistance and Hex will be achieved when at least two elements are added to Mn at the same time.

[Experiment 3]

The dependence of the exchange anisotropic magnetic field on the temperature when an X-Mn alloy is used as the antiferromagnetic layer was studied.

A Rh-Mn alloy which exhibits the maximum Hex value in Experiment 1 was selected as the ferromagnetic layer sample in Experiment 3. For the comparison, a ferromagnetic layer of a conventional Fe-Mn alloy was evaluated at the same time.

The sample is identical to that in Experiment 1, that is, a 200-angstrom Ta barrier layer, a 200-angstrom $Ni_{80}Fe_{20}$ (atomic %) alloy ferromagnetic layer thereon, a 300-angstrom antiferromagnetic layer thereon composed of $Rh_{22.4}Mn_{77.6}$ (atomic %; as Example) or $Fe_{50}Mn_{50}$ (atomic %; as Comparative Example) alloy, and a 200-angstrom Ta barrier layer thereon are deposited on a glass substrate by sputtering. The heat treatment for changing the crystal structure of the X-Mn alloy was not carried out.

Two samples of Example and Comparative Example were heated from 24° C. to 260° C. in a vacuum to measure M-H loops at various temperature.

Respective exchange anisotropic magnetic fields (Hex) at various temperature are determined.

Figure 3:
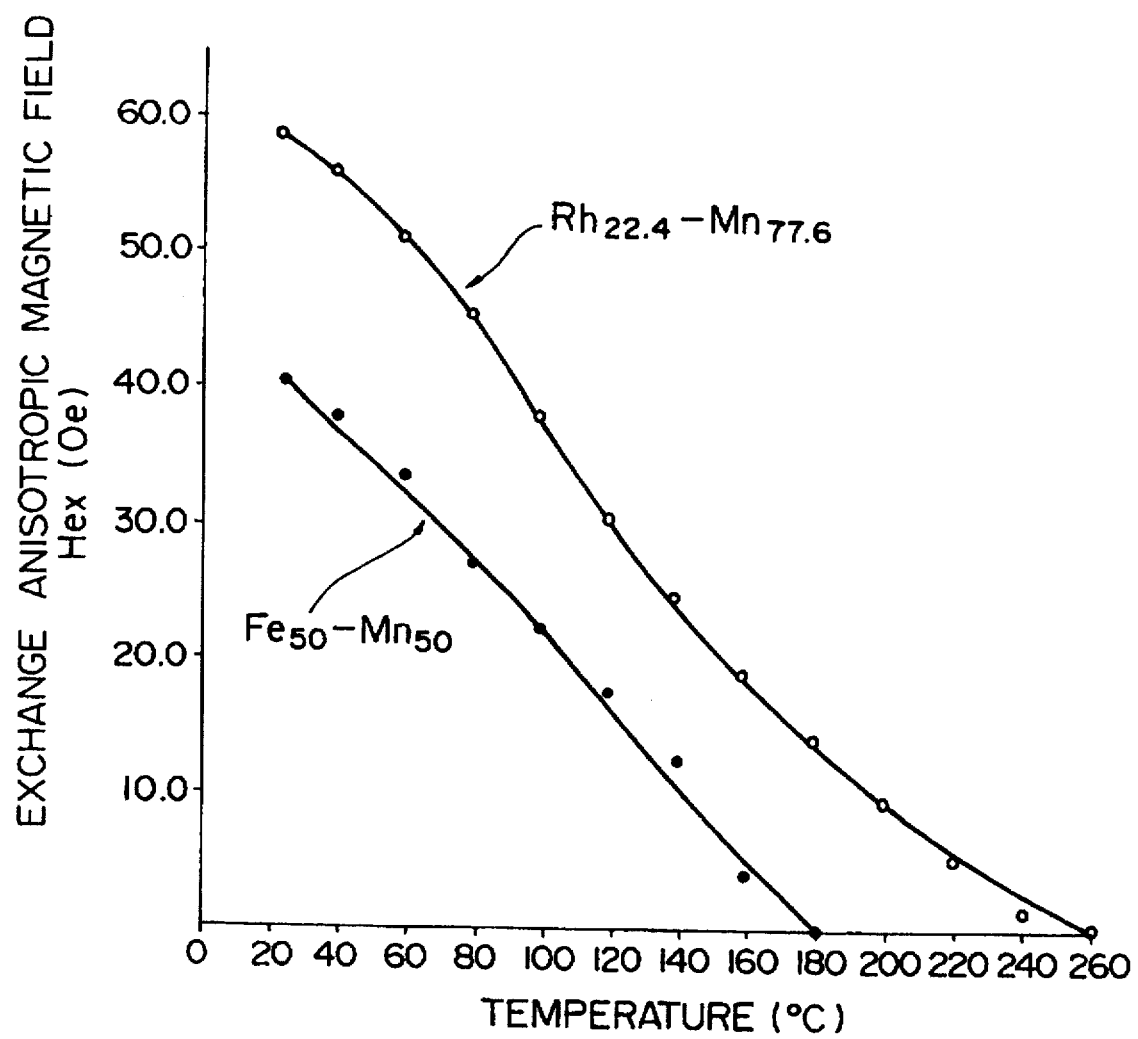
FIG. 3 is a graph illustrating the correlation between the temperature in Experiment 3 and the exchange anisotropic magnetic field.

Table 6 shows the experimental results, and FIG. 3 is a graph based on the results in Table 6, i.e., the correlation between the temperature and the exchange anisotropic magnetic field.

Table 6 and FIG. 6 demonstrate that the $Rh_{22.4}Mn_{77.6}$ alloy antiferromagnetic layer has a greater Hex Value compared with $Fe_{50}Mn_{50}$ alloy antiferromagnetic layer at a temperature of 24° C. Hex values of these two samples decrease with the increased temperature, and the Hex value of the $Rh_{22.4}Mn_{77.6}$ sample is always higher than that of the $Fe_{50}Mn_{50}$ sample over the entire temperature range. The temperature, at which the exchange anisotropic magnetic field (Hex) becomes zero Oe, is 260° C. in the $Rh_{22.4}Mn_{77.6}$ sample, or 180° C. in the $Fe_{50}Mn_{50}$ sample.

As described above, the temperature generally may rise to around 120° C. in magnetic reproducing units, such as hard disk units. In such an operation condition, the magnetic anisotropy of the ferromagnetic layer in the thin film magnetic head drastically decreases when an Fe-Mn alloy is used as the antiferromagnetic layer since the exchange anisotropic coupling cannot be achieved at 180° C., so that the noise significantly increases in the reproducing output. In contrast, in the thin film magnetic head using the Rh-Mn alloy as the antiferromagnetic layer, the exchange anisotropic magnetic field does not reach zero at a temperature over 200° C. Further, at 120° C., a high Hex value, i.e., 30.5 Oe is achieved. Accordingly, in thin film magnetic heads using Rh-Mn alloys as the antiferromagnetic layer, the uniaxial anisotropy of the ferromagnetic layer can be stabilized and thus the noise component in the reproducing output can be reduced, even if the environmental temperature rises.

TABLE 6

Dependence of Hex (Oe) on Temperature
M-H Loop was measured by Heating in a vacuum

| Temperature (°C.) | $Rh_{22.4}$ | $Fe_{50.0}$ |
|---|---|---|
| 24 | 58.6 | 40.5 |
| 40 | 56.0 | 37.7 |
| 60 | 51.0 | 33.5 |
| 80 | 45.3 | 27.2 |
| 100 | 37.8 | 22.3 |
| 120 | 30.5 | 17.5 |
| 140 | 24.8 | 12.5 |
| 160 | 18.8 | 4.2 |
| 180 | 14.2 | 0 |
| 200 | 9.6 | 0 |
| 220 | 5.2 | 0 |
| 240 | 1.5 | 0 |
| 260 | 0 | 0 |

As described above, since the thin film magnetic head in accordance with the present invention uses an X-Fin alloy having an irregular crystal structure as the antiferromagnetic layer and the X content is limited, stable exchange anisotropic coupling can be achieved with the ferromagnetic field. This alloy exhibits excellent corrosion resistance and a decreased variance in the exchange anisotropic magnetic field with the temperature rise. Therefore, a thin film magnetic head durable to the environmental change during operation can be obtained.

Since the X-Mn alloy having an irregular crystal structure is in the as-deposited state and does not requires additional heat treatment, the production process of the thin film magnetic head can be simplified.

What is claimed is:

1. A magnetoresistive head comprising:
    a magnetoresistive sensor, and
    an antiferromagnetic layer formed on the magnetoresistive sensor;
    wherein said magnetoresistive sensor includes a ferromagnetic layer magnetized by exchange anisotropic coupling with said antiferromagnetic layer; and
    wherein said antiferromagnetic layer consists of an X-Mn (manganese) alloy having an irregular crystal structure, wherein X is at least one element selected from the group consisting of Ru (ruthenium), Ir (iridium) and Pt (platinum).

2. A magnetoresistive head in accordance with claim 1, wherein said X is Ru and the Ru content in said Ru-Mn alloy is 10 to 45 atomic %.

3. A magnetoresistive head in accordance with claim 1, wherein said X is Rh and the Rh content in said Rh-Mn alloy is 10 to 40 atomic %.

4. A magnetoresistive head in accordance with claim 1, wherein said X is Ir and the Ir content in said Ir-Mn alloy is 10 to 40 atomic %.

5. A magnetoresistive head in accordance with claim 1, wherein said X is Pd and the Pd content in said Pd-Mn alloy is 10 to 25 atomic %.

6. A magnetoresistive head in accordance with claim 1, wherein said X is Pt and the Pt content in said Pt-Mn alloy is 10 to 25 atomic %.

7. A magnetoresistive head in accordance with claim 1, wherein X is at least two elements selected from the group consisting of Ru, Rh, Ir, Pd and Pt, and the total content of the at least two elements in the X-Mn alloy is 10 to 45%.

8. A magnetoresistive head in accordance with claim 1, wherein said antiferromagnetic layer is in an as-deposited state.

9. A magnetoresistive head in accordance with claim 1, wherein said antiferromagnetic layer is in an annealed state.

10. A magnetoresistive head comprising:

a magnetoresistive sensor; and an antiferromagnetic layer formed on the magnetoresistive sensor;

where said magnetoresistive sensor includes a ferromagnetic layer magnetized by exchange anisotropic coupling with said antiferromagnetic layer; and wherein said antiferromagnetic layer consists of an X-Mn (manganese) alloy having an irregular crystal structure, wherein X is at least one element selected from the group consisting of Ru (ruthenium), Ir (iridium) and Pt (platinum).

11. A magnetoresistive head in accordance with claim 10, wherein X is Ru, and the Ru content in said Ru-Mn alloy is 10 to 45%.

12. A magnetoresistive head in accordance with claim 10, wherein X is Ir, and the Ir content in said Ir-Mn alloy is 10 to 40%.

13. A magnetoresistive head in accordance with claim 10, wherein X is Pt, and the Pt content in said Pt-Mn alloy is 10 to 40%.

14. A magnetoresistive head in accordance with claim 10, wherein X is at least two elements selected from the group consisting of Rh, Ir and Pt, and the total content of the at least two elements in the X-Mn alloy is 10 to 45%.

15. A magnetoresistive head in accordance with claim 10, wherein said antiferromagnetic layer is in an as-deposited state.

16. A magnetoresistive head in accordance with claim 10, wherein said antiferromagnetic layer is in an annealed state.

* * * * *